(12) United States Patent
Cooper et al.

(10) Patent No.: US 8,616,815 B2
(45) Date of Patent: Dec. 31, 2013

(54) FASTENER

(75) Inventors: Joseph B Cooper, Brize Norton (GB); Paul R Hayton, Bristol (GB)

(73) Assignee: Rolls-Royce PLC, London (GB)

( * ) Notice: Subject to any disclaimer, the term of this patent is extended or adjusted under 35 U.S.C. 154(b) by 343 days.

(21) Appl. No.: 13/178,010

(22) Filed: Jul. 7, 2011

(65) Prior Publication Data

US 2012/0034046 A1 Feb. 9, 2012

(30) Foreign Application Priority Data

Aug. 5, 2010 (GB) .................................. 1013172.0

(51) Int. Cl.
*F16B 19/00* (2006.01)
(52) U.S. Cl.
USPC .......................................... 411/361; 411/901
(58) Field of Classification Search
USPC ......... 411/360, 361, 383, 385, 900–902, 305, 411/339; 470/8, 9, 11, 17; 285/381.1
See application file for complete search history.

(56) References Cited

U.S. PATENT DOCUMENTS

| 3,383,975 | A | | 5/1968 | Cushman | |
|---|---|---|---|---|---|
| 3,633,951 | A | | 1/1972 | Hinkle et al. | |
| 3,731,724 | A | | 5/1973 | Dorflinger | |
| 4,439,078 | A | | 3/1984 | Dessouroux | |
| 4,824,314 | A | | 4/1989 | Stencel | |
| 5,234,300 | A | * | 8/1993 | Fluckiger | 411/383 |
| 5,549,432 | A | * | 8/1996 | Reneau | 411/432 |
| 5,569,008 | A | * | 10/1996 | Chapkovich | 411/383 |
| 5,961,266 | A | * | 10/1999 | Tseng | 411/383 |
| 6,171,041 | B1 | * | 1/2001 | Bazinski et al. | 411/366.1 |
| 6,382,893 | B1 | * | 5/2002 | Reed | 411/178 |
| 6,673,469 | B2 | * | 1/2004 | Isaccsson et al. | 428/642 |
| 7,530,775 | B2 | * | 5/2009 | Jaconelli et al. | 411/383 |
| 7,678,153 | B2 | * | 3/2010 | Katz et al. | 623/21.11 |
| 7,717,658 | B2 | * | 5/2010 | Peltier | 411/411 |
| 7,967,562 | B2 | * | 6/2011 | Frost et al. | 415/197 |
| 8,016,534 | B2 | * | 9/2011 | Nilsen | 411/360 |
| 2005/0079027 | A1 | | 4/2005 | Ernst et al. | |
| 2009/0110509 | A1 | * | 4/2009 | Strom | 411/178 |

FOREIGN PATENT DOCUMENTS

| CN | 2181590 Y | 11/1994 |
|---|---|---|
| EP | 0 987 452 A1 | 3/2000 |
| ES | 1 068 433 | 10/2008 |
| GB | 1072254 | 6/1967 |
| GB | 1 434 183 | 5/1976 |
| SE | 511 876 C2 | 12/1999 |

OTHER PUBLICATIONS

European Search Report dated Nov. 2, 2011 issued in European Patent Application No. 11 17 4048.
British Search Report issued in British Application No. GB1013172.0 dated Dec. 3, 2010.
British Search Report issued in British Application No. GB1013163.9 dated Dec. 3, 2010.
British Search Report issued in British Application No. GB1013168.8 dated Dec. 3, 2010.
British Search Report issued in British Application No. GB1013169.6 dated Dec. 3, 2010.

* cited by examiner

*Primary Examiner* — Gary Estremsky
(74) *Attorney, Agent, or Firm* — Oliff & Berridge, PLC

(57) ABSTRACT

A fastener (2) comprising an elongate core (4) and made of titanium or titanium alloy, and a sleeve (6) made of a different material and having an external thread (26), the core (4) being disposed within the sleeve (6) and fixed with respect to the sleeve (6).

10 Claims, 4 Drawing Sheets

FASTENER

This invention relates to a fastener.

It is sometimes necessary to tighten a bolt or similar screwthreaded fastener to achieve a predetermined tension in the bolt. This ensures that the joint secured by the bolt is sufficiently tight without overstretching the bolt.

Conventional techniques for achieving a desired bolt tension rely on measuring the torque applied to the bolt on the assumption that there is a fixed relationship between this torque and the tension in the bolt.

In applications in which large torques are required to tighten the bolt, tightening of the bolt can generate large friction loads which cause the surface of the bolt thread to pick up and become rough in a process known as galling. Galling further increases the frictional loads acting between the bolt and the nut and therefore increases the amount of torque required to achieve a particular bolt tension. Moreover, the extent of galling is unpredictable. The galling process thus makes the conventional torque tightening techniques unreliable since the torque generated cannot be used to determine accurately the tension in the bolt.

In the case of a steel bolt, galling of the bolt can be reduced by coating the thread with which it engages, for example the thread of a nut, with silver which acts as a lubricant. However, in some applications it is desirable to use titanium bolts, for example in aerospace applications in which weight is to be minimised. The combination of titanium bolts with screwthreads having a silver coating is known to be corrosive. This makes silver coatings unsuitable for use with titanium bolts. Alternative lubricants such as grease, engine oil and dry film lubricants have been tried to reduce galling. However, the amount of friction generated using these lubricants has been found to fluctuate considerably, leading to a lack of certainty when tightening to a predetermined torque.

Consequently, alternative tightening techniques, such as the use of ultrasonics to measure the increase in length of the bolt, have been developed to determine the amount of tension through the bolt. These techniques are time consuming and costly.

Stated broadly, the present invention provides a fastener comprising: a core made of a first material and having a first end and a second end; and a sleeve made of a second material and having an external thread, the core being disposed within the sleeve and fixed with respect to the sleeve. The properties of the first and second materials being such that the second material is less subject to galling than the first material.

According to a first aspect of the present invention there is provided a fastener comprising: a core made of a first material and having a first end and a second end, wherein the core is provided with an engagement surface and a retaining shoulder which extends transversely of the length of the core and has a transverse dimension greater than that of the engagement surface; and a sleeve made of a second material and having an external thread, the core being disposed within the sleeve such that an inner surface of the sleeve engages the engagement surface and the retaining shoulder prevents the sleeve from being displaced in a lengthwise direction with respect to the core, the transverse dimension of the inner surface of the sleeve being expandable by heat to enable the sleeve to pass over the retaining shoulder.

The inner surface of the sleeve may be an interference fit or may be a transition fit on the engagement surface of the core when the sleeve and the core are at the same temperature.

The core may provided with an abutment shoulder spaced away from the retaining shoulder in the lengthwise direction of the core, the sleeve being disposed between the retaining shoulder and the abutment shoulder.

The fastener may comprise a locking means for preventing rotation of the sleeve with respect to the core.

The locking means may comprise a protrusion on a surface of the core and a notch in the sleeve, wherein the protrusion engages with the notch to prevent rotation of the core with respect to the sleeve.

The core may be provided with a non-circular profile for engagement by a tool to rotate the fastener.

The first material may be titanium or a titanium alloy.

The second material may be steel.

According to a second aspect of the present invention there is provided a method of assembling a fastener according to the fourth aspect of the invention, comprising the steps:
heating the sleeve to an elevated temperature which is equal to or greater than a predetermined temperature in order to expand the sleeve;
fitting the sleeve onto the core by displacing the sleeve over the retaining shoulder whilst at the elevated temperature;
subsequently cooling the sleeve below the predetermined temperature to contract the sleeve into engagement with the engagement surface of the core.

For a better understanding of the present invention, and to show more clearly how it may be carried into effect, reference will now be made, by way of example, to the accompanying drawings, in which.

Figure 1:
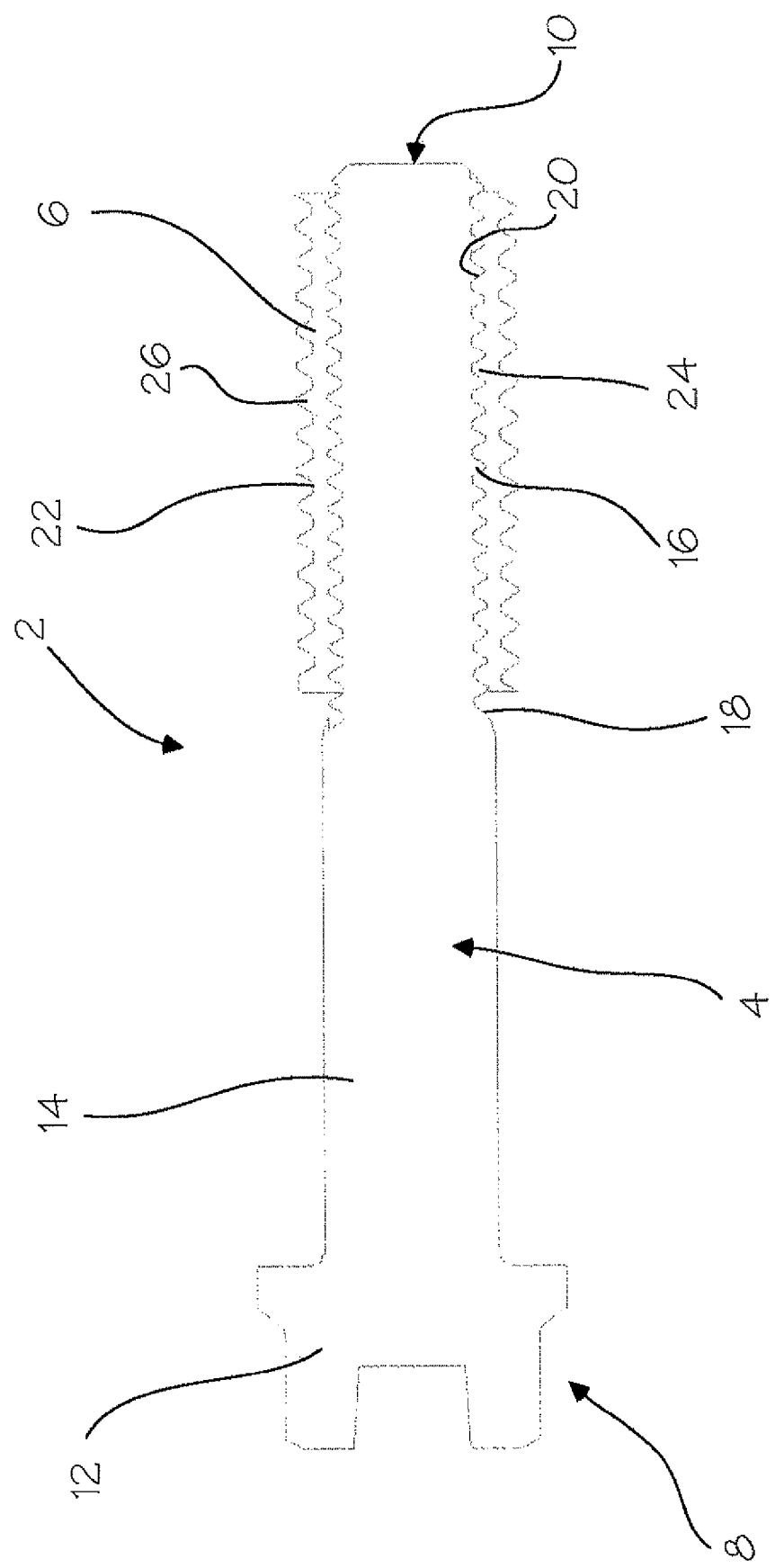
FIG. 1 is a schematic sectional view of a first fastener.

FIG. 1 shows a fastener 2, in the form of a bolt, comprising an elongate core 4 disposed within a tubular sleeve 6. The core 4 is made of titanium or a titanium alloy, such as Titanium beta C, and the sleeve 6 is made of steel, for example a "standard" steel or a heat resisting steel, such as FV535; or a suitable nickel and/or chromium containing alloy such as C263, Inconel 718, Waspaloy or A 286.

The core 4 is substantially cylindrical, and has a first end 8 and a second end 10. The core 4 comprises a bolt head 12 at the first end 8, and a shank 14 which extends from the bolt head 12 to the second end 10. The bolt head 12 has a suitable internal or external non-circular profile for engagement by a tool to apply torque to the bolt 2. The shank 14 is provided with a receiving thread 16 which extends from the second end 10 to approximately midway along the length of the shank 14. An abutment shoulder 18 is formed on the surface of the shank 14 at the end of the receiving thread 16 away from the second end 10. In the embodiment shown, the abutment shoulder 18 is formed by a portion of the shank 14 having a diameter which is greater than the minimum diameter of the receiving thread 16. The abutment shoulder 18 thus extends transversely of the length of the shank 14. The shank 14 is non-threaded between the abutment shoulder 18 and the bolt head 12, and the abutment shoulder 18 is in effect the transition between the thread 16 and the non-threaded part of the shank 14.

The sleeve 6 has an inner surface 20 and an outer surface 22. An internal thread 24 is provided on the inner surface 20 and an external thread 26 is provided on the outer surface 22. The internal thread 24 corresponds to the receiving thread 16 on the core 4. The internal and external threads 24, 26 extend along the entire length of the sleeve 6.

FIG. 1 shows the sleeve 4 disposed midway along the receiving thread 16 so that it is spaced away from the abutment shoulder 18. The second end 10 of the core 4 protrudes from the end of the sleeve 6.

The internal and external threads 24, 26 of the sleeve and the receiving thread 16 of the core have the same handedness; that is, the directions of twist of the threads are the same.

Prior to installation, the fastener 2 is assembled by threading the sleeve 6 onto the receiving thread 16 until an end of the sleeve 6 abuts the abutment shoulder 18. The abutment shoulder 18 prevents the sleeve 6 from being wound further along the shank 14. The sleeve 6 is thus held rotationally fast with respect to the core 4 in the direction in which the sleeve 6 is wound onto the core 4. The interlock of receiving thread 16 and the internal thread 16, 24 prevents displacement of the sleeve 6 with respect to the core 4 in the lengthwise direction.

The fastener 2 is installed by winding the assembled fastener 2 into a connector, such as a nut or boss, having an internal thread which corresponds to the external thread 26 of the sleeve 6. The handedness of the threads 16, 24, 26 ensures that the sleeve 6 remains forced against the abutment shoulder 18, and thus rotatably fixed with respect to the fastener 2. The amount of torque transferred through the sleeve 6 is therefore equal to the amount of torque applied to the bolt head 12. The external thread 26 is made of a suitable alloy other than titanium, which allows the thread of the connector to be coated with silver or other surface coating to reduce galling without leading to corrosion. Consequently, the torque applied to the bolt head 12 can be measured and used to determine accurately the amount of tightening of the fastener 2, for example, to determine the amount of tension through the fastener 2.

Figure 2:
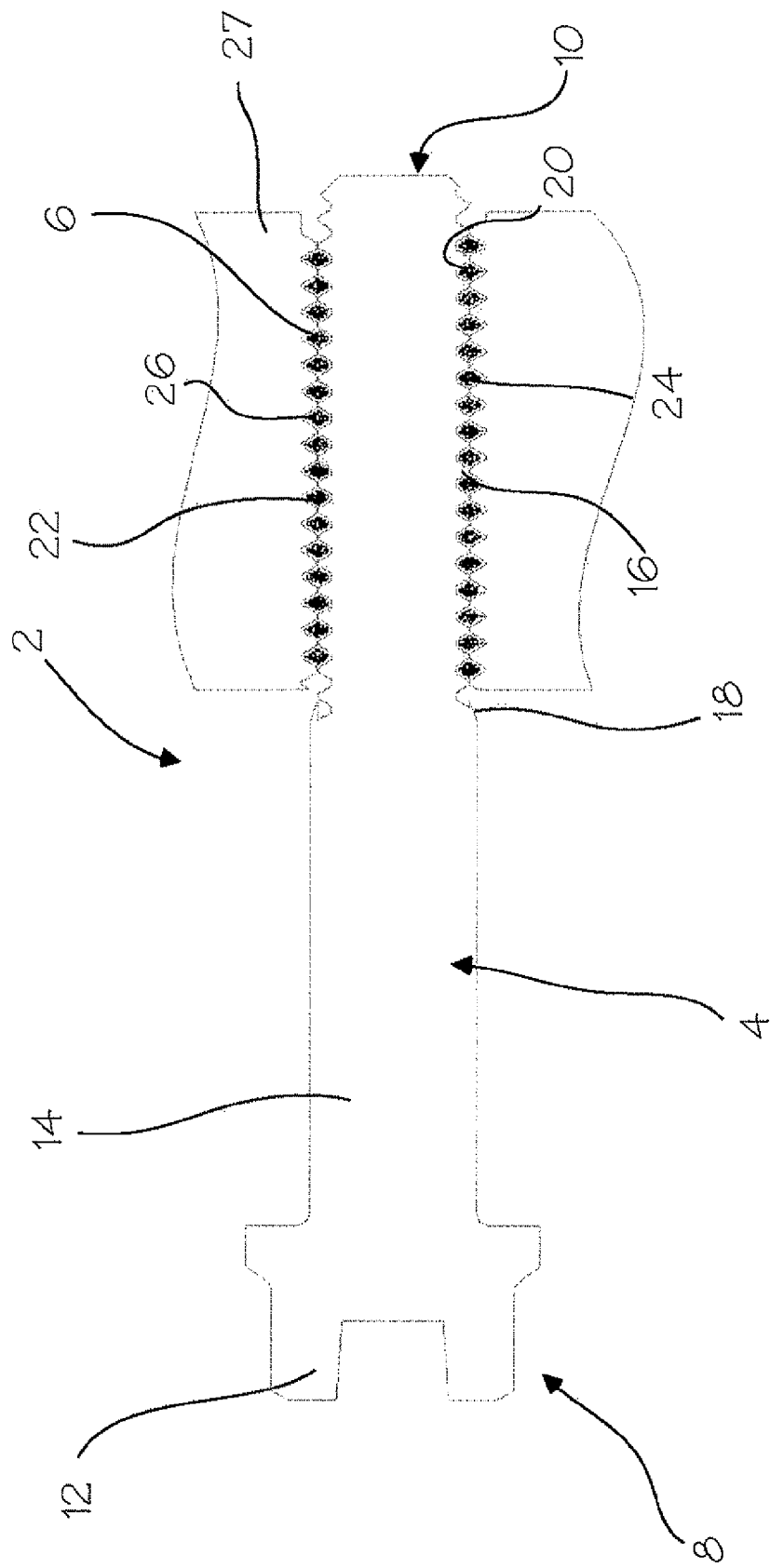
FIG. 2 is a schematic sectional view of a second fastener.

FIG. 2 shows a variant of the fastener shown in FIG. 1. The fastener 2 is shown installed within a boss 27. The sleeve 4 consists of a helical coil, which in the embodiment shown is a coil of wire, wound about the receiving thread 16 of the core 4. The wire which forms the sleeve 4 has a rhombus cross-section having respective opposing vertices in the lengthwise direction and the transverse direction of the core 4.

The opposing vertices in the transverse direction form the respective internal and external threads 24, 26. The sleeve 6 is fixed with respect to the core 4 by winding the sleeve against the abutment shoulder 18 in the same manner as described with respect to the fastener shown in FIG. 1.

A sleeve 6 consisting of a helical coil is more lightweight and more flexible than a solid-walled sleeve and can therefore better accommodate a different expansion rate of the core 4 with respect to the sleeve 6 when used for hotter applications.

It will be appreciated that the sleeve 6 could be fixed with respect to the core 4 by deforming the protruding portion of the second end 10 of the core 4, for example to form a retaining flange at the end of the core 4. Alternatively, or in addition, a notch could be formed in the shank 14 into which the sleeve 6 is deformed.

Figure 3:
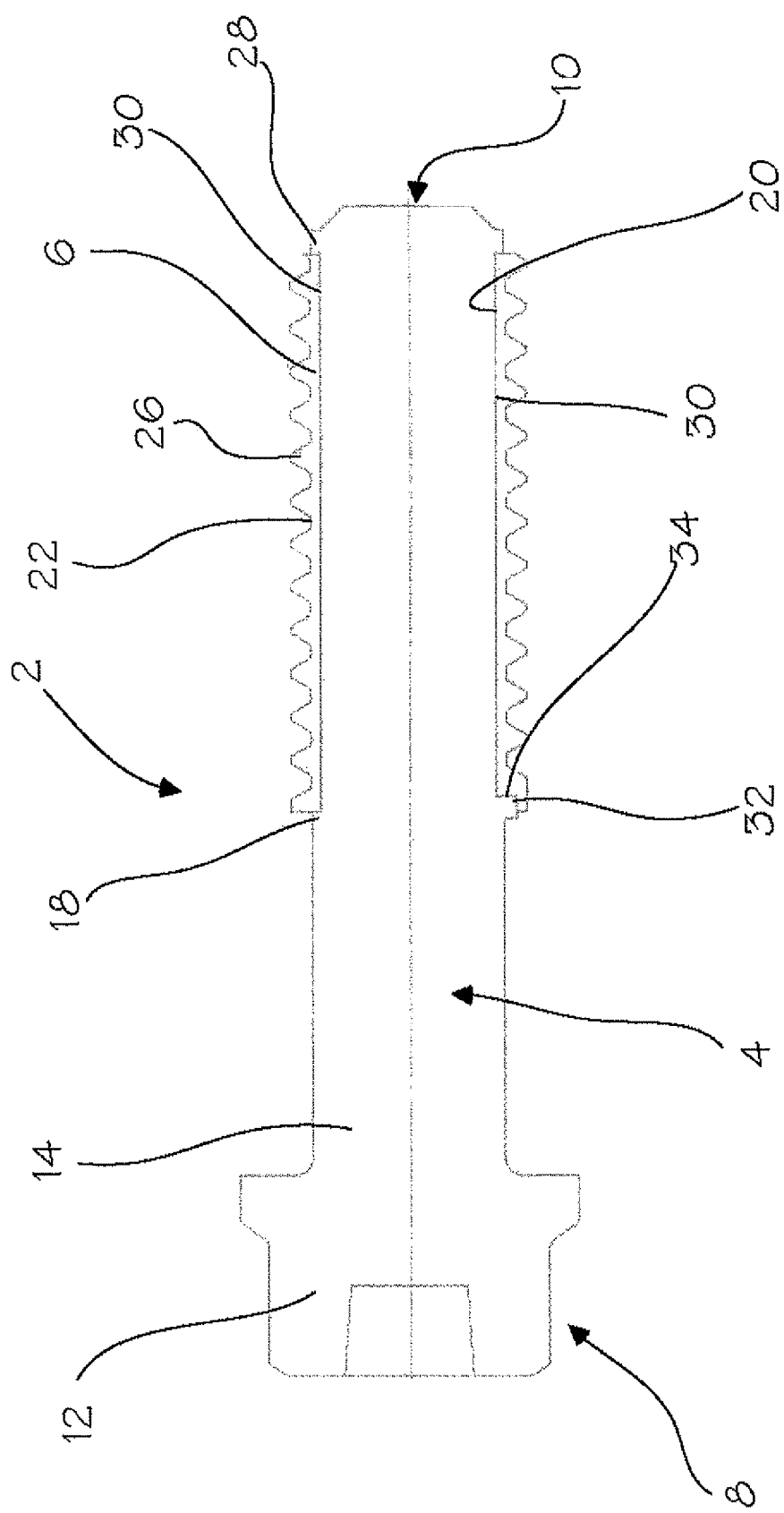
FIG. 3 is a schematic sectional view of a third fastener.
Figure 4:
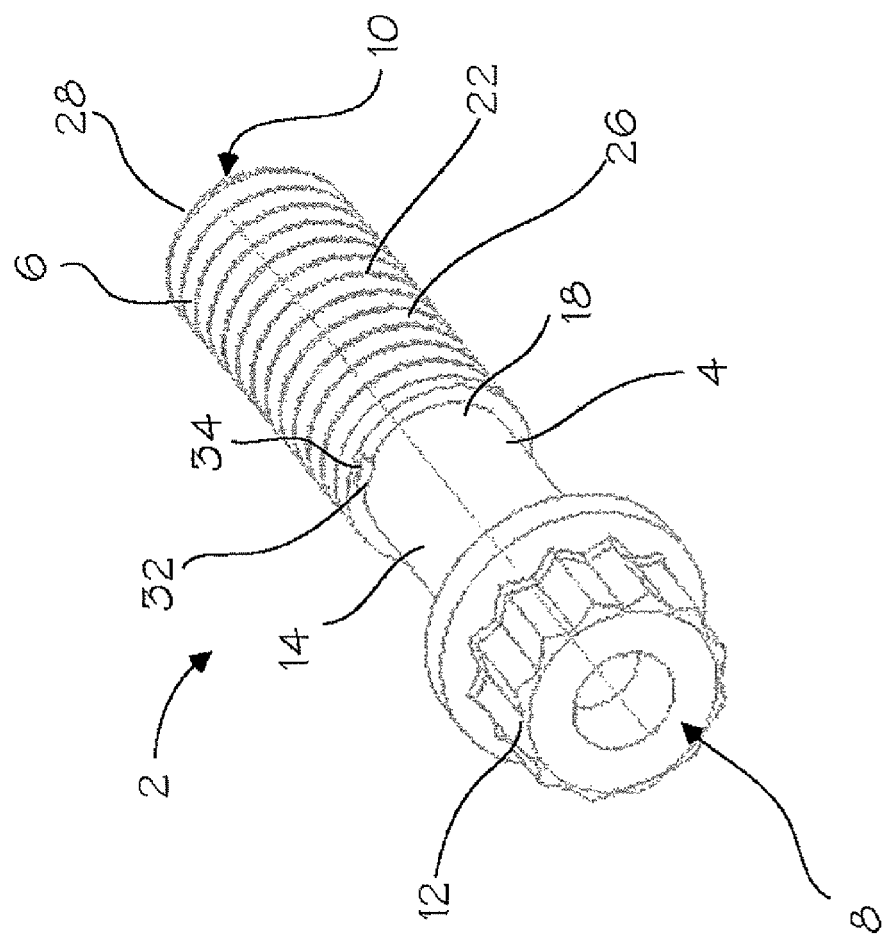
FIG. 4 is a schematic perspective view of the third fastener.

FIGS. 3 and 4 show a fastener 2, in the form of a bolt, comprising an elongate core 4 disposed within a tubular sleeve 6. The core 4 and the sleeve 6 may be made from the materials referred to above in connection with FIG. 1.

The core is substantially cylindrical, and has a first end 8 and a second end 10. The core 4 comprises a bolt head 12 at the first end 8, and a shank 14 which extends between the bolt head 12 and the second end 10. The shank 14 is non-threaded along its entire length.

An abutment shoulder 18 is formed on the surface of the shank 14 midway along the length of the shank 14. The abutment shoulder 18 extends transversely of the length of the shank 14.

A retaining shoulder 28 is formed at, or proximate to, the second end 10 of the core 4. The retaining shoulder extends transversely of the length of the shank 14. The abutment shoulder 18 and the retaining shoulder 28 bound a portion of the shank 14 between them thereby defining an engagement surface 30 along the surface of the shank 14 for receiving the sleeve 6. In the embodiment shown, the engagement surface 30 is substantially smooth and extends circumferentially and parallel to the length of the core 4. The abutment shoulder 18 and the retaining shoulder 28 extend outwardly from engagement surface 30 to the same radial extent.

A locking means in the form of a lug 32 is provided at the engagement surface and adjacent the abutment shoulder 18. The lug 32 extends outwardly from the engagement surface 30 and extends further outwardly than the retaining shoulder 28. In the embodiment shown, the lug 32 is formed integrally with both the abutment shoulder 18 and the engagement surface 30.

The sleeve 6 has an inner surface 20 and an outer surface 22. The inner diameter of the sleeve 6 corresponds to the diameter of the portion of shank 14 along which the engagement surface 30 is formed. The diameter of the shank 14 and the inner diameter of the sleeve 6 are such that when the sleeve 6 and the core 4 are at the same temperature the inner surface 20 and the engagement surface 30 are in contact. The sleeve 6 may, for example, be an interference fit or transition fit with the engagement surface 30. An external thread 26 is provided on the outer surface 22 of the sleeve 6. The external thread 26 extends along the entire length of the sleeve 6. The length of the sleeve 6 is equal to or less than the distance between the retaining shoulder 28 and the abutment shoulder 18 in the lengthwise direction of the core 4.

A notch 34 is provided in one end of the sleeve 6. The notch 34 is defined so as to receive the lug 32 in the lengthwise direction of the core 4.

Prior to installation, the fastener 2 is assembled by heating the sleeve 6 to an elevated temperature in order to expand the sleeve 6 in the radial direction. The elevated temperature is a predetermined temperature which will cause the inner diameter of the sleeve 6 to expand sufficiently to allow the sleeve 6 to pass over the retaining shoulder 28. It will be appreciated that the predetermined temperature will depend on the material of the sleeve and the height of the retaining shoulder 28 above the engagement surface 30. The sleeve 6 is fitted onto the core 4 by passing the sleeve 6 over the retaining shoulder 18 in the direction of the bolt head 12. The sleeve 6 is slid along the shank 14 until the notch 34 is brought into abutting engagement with the lug 32. The sleeve 6 may have to be rotated to align the notch 34 with the lug 32.

The sleeve 6 is then cooled, or allowed to cool, to below the elevated temperature to contract the sleeve 6 thereby bringing the inner surface 20 into contact with the engagement surface 30. The sleeve 6 locates between the abutment shoulder 18 and the retaining shoulder 28. The sleeve 6 is thus prevented from being displaced in the lengthwise direction of the core 2 by the abutment shoulder 18 and the retaining shoulder 28. The lug 32 prevents the sleeve 6 from being rotated with respect to the core 4. The external thread 26 of the sleeve 6 thus forms a fixed thread on the fastener 2.

The fastener 2 is installed in the same manner as described with respect to the fasteners shown in FIGS. 1 and 2.

Although fasteners comprising a titanium core and a sleeve of a different suitable alloy have been described, other combinations of material are envisaged in which the sleeve, or the external thread provided thereon, is made of a material which is harder and or/more dense than the core; in particular, fasteners in which spalling characteristics of the sleeve material are preferable to those of the core material.

The invention claimed is:

1. A fastener comprising:
   a core made of a first material and having a first end and a second end, wherein the core is provided with an engagement surface and a retaining shoulder which extends transversely of the length of the core and has a transverse dimension greater than that of the engagement surface; and
   a sleeve made of a second material and having an external thread, the core being disposed within the sleeve such that an inner surface of the sleeve engages the engagement surface and the retaining shoulder prevents the sleeve from being displaced in a lengthwise direction with respect to the core, the transverse dimension of the inner surface of the sleeve being expandable by heat to enable the sleeve to pass over the retaining shoulder.

2. A fastener according to claim 1, in which the inner surface of the sleeve is an interference fit or transition fit on the engagement surface of the core when the sleeve and the core are at the same temperature.

3. A fastener according to claim 1, wherein the core is provided with an abutment shoulder spaced away from the retaining shoulder in the lengthwise direction of the core and the sleeve is disposed between the retaining shoulder and the abutment shoulder.

4. A fastener according to claim 1, wherein the fastener comprises a locking means for preventing rotation of the sleeve with respect to the core.

5. A fastener according to claim 4, in which the locking means comprises a protrusion on a surface of the core and a notch in the sleeve, wherein the protrusion engages with the notch to prevent rotation of the core with respect to the sleeve.

6. A fastener according to claim 1, in which the core is provided with a non-circular profile for engagement by a tool to rotate the fastener.

7. A fastener according to claim 1, in which the first material is titanium or a titanium alloy.

8. A fastener according to claim 1, in which the second material is steel.

9. A method of assembling a fastener according to claim 1, comprising the steps:
   (a) heating the sleeve to an elevated temperature which is equal to or greater than a predetermined temperature in order to expand the sleeve;
   (b) fitting the sleeve onto the core by displacing the sleeve over the retaining shoulder whilst at the elevated temperature; and
   (c) subsequently cooling the sleeve below the predetermined temperature to contract the sleeve into engagement with the engagement surface of the core.

10. A method of assembling a fastener as claimed in claim 9 and substantially as described herein.

* * * * *